UNITED STATES PATENT OFFICE.

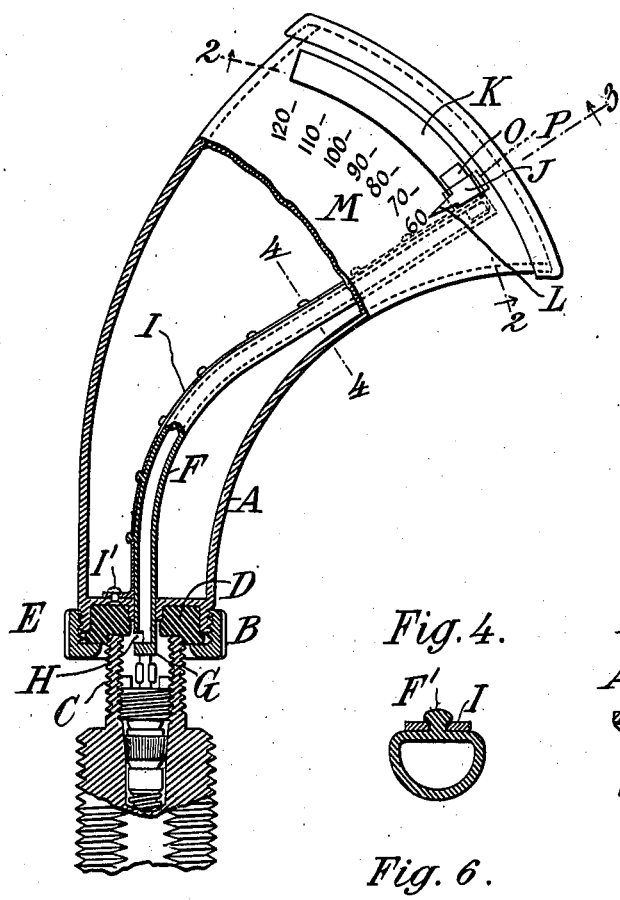

HENRY P. KRAFT, OF RIDGEWOOD, AND MAXIMILIAN CHARLES SCHWEINERT, OF WEST HOBOKEN, NEW JERSEY.

GAUGE.

1,421,501.          Specification of Letters Patent.          Patented July 4, 1922.

Application filed March 25, 1916. Serial No. 86,733.

*To all whom it may concern:*

Be it known that we, HENRY P. KRAFT and MAXIMILIAN CHARLES SCHWEINERT, citizens of the United States of America, and residing in Ridgewood, in the county of Bergen and State of New Jersey, and West Hoboken, in the county of Hudson and State of New Jersey, respectively, have invented certain new and useful Improvements in Gauges, of which the following is a specification.

This invention relates to gauges, and is particularly adapted for use in measuring air pressure in tires.

The object is to provide a simple, compact, and inexpensive gauge which will accurately measure the air pressure, and which may be read after the gauge is removed from the tire valve.

To this end we provide a gauge comprising a casing preferably having a quick detachable foot which fits over the end of the tire valve and unseats the check of the latter, said casing containing a tubular member of bent or curved form which is adapted to be straightened by internal pressure, the end of which tubular member actuates an indicator which is mounted to move on the casing, the tube and indicator being separated so that the indicator is moved to a position corresponding to the pressure, and is held in such position by friction or otherwise when the gauge is removed from the tire valve, the tube returning to its original or zero position.

Referring to the drawings which illustrate one form of the invention,

Fig. 1 is a view partly in elevation and partly in longitudinal section.

Fig. 2 is a cross-section on the line 2—2 in Fig. 1.

Fig. 3 is a detail view of the indicator slide and parts of the casing.

Fig. 4 is a cross-section on the line 4—4, Fig. 1.

Figs. 5 and 6 are detail views of a modified form of pressure tube, Fig. 6 being a partial elevation and Fig. 5 being a cross-section.

Referring to the drawings, let A indicate the casing, which, as shown, is preferably of curved and flaring form, its lower end B being of sufficient dimensions to fit over the end of a tire valve such as C. A packing D is provided which rests against the end of the valve nipple to make a tight joint between the gauge and the valve, such packing being shown as held in place by a sleeve E.

The pressure-responsive member contained within the casing is preferably a tube F which may be said to be of the Bourdon type. It is normally bent or curved, by preference to a degree which is less than a semicircle, and is closed at its outer end to form a chamber into which the air passes from the tire. In the construction shown the lower end of the tube is continued below the packing D and forms an unseating member G for the tire valve. A passage H is formed in the lower end through which air is admitted from the valve to the tube. The tube F may be formed of any suitable material, but we prefer to construct it of rubber having a certain degree of flexibility. The spring action of the rubber may be supplemented by a spring I, or the latter may constitute the sole spring element. As shown, the spring I is fastened to the bottom of the casing, as shown at I', and follows the contour of the rubber tube to its end. The spring may be connected to the rubber tube in any suitable manner, as for instance that best shown at Fig. 4, wherein the tube is provided with small buttons or teats F' which are forced through openings in the spring. Or the spring may be formed with arms such as I² adapted to partially embrace the tube, as shown in Figs. 5 and 6. In either construction as the tube expands the spring will be straightened, and upon relief of the pressure the spring will restore the tube to its normal position.

According to the present invention means are provided for registering the position to which the tube is moved by the pressure, so that when the gauge is removed from the valve and the tube returns to its original position, the indication may be read at the operator's convenience. In the construction shown such means comprise a slide J which is adapted to move along a slot K formed in the upper end of the casing, the slot being preferably slightly curved in accordance with the arc which is described by the free end of the tube in its movements. Preferably the slide J is provided with an indicating pointer L which moves along a graduated scale M. In order to maintain the slide yieldingly in position, a spring such as O may be provided at the back of the slide, which spring normally presses the slide outwardly so that its shoulders P, P (Fig. 3) engage the edges of the casing.

In operation the end of the tube F engages the slide and pushes it over to the pressure corresponding to that in the tire, whereupon the tube is free to move back to its initial position when the gauge is removed from the valve. The indication may be then read and the slide restored by hand to its initial position.

While we have shown and described one form of the invention, it will be understood that we do not wish to be limited thereto since various changes may be made therein without departing from the spirit of the invention.

What we claim is:—

1. A pressure gauge having a Bourdon tube and a visual indicating part adapted to be directly engaged by said tube and moved to an indicating position, said indicating part and tube being disconnected, whereby the tube may return to its initial position without moving said indicating part.

2. A pressure gauge having a Bourdon tube and a visual indicating part adapted to be directly engaged by said tube and moved to an indicating position, said indicating part and tube being disconnected, whereby the tube may return to its initial position without moving said indicating part, and said indicating part comprising a slide movable along said gauge.

3. A pressure gauge having a Bourdon tube bent to form less than a semi-circle, one end of said tube being fixed and the other end of said tube being movable, a slide-way along which the movable end of said tube moves, and a slide movable along said slide-way adapted to be actuated in one direction by said tube, said tube and slide being disconnected, whereby the tube may return to its initial position without affecting said slide.

4. A pressure gauge adapted at one end to engage the end of a tire valve and having means for unseating the valve, a tube having an opening at its end adapted to form a passage for the air from said valve, said tube being bent and adapted to be straightened by the pressure, a slot in said casing and an indicating slide movable along said slot, said tube being adapted to engage said slide and move it to indicating position, and said tube and slide being disconnected, whereby the tube may return to its initial position without affecting the position of said slide.

In witness whereof, we have hereunto signed our names in the presence of two subscribing witnesses.

HENRY P. KRAFT.
MAXIMILIAN CHARLES SCHWEINERT.

Witnesses:
E. V. MYERS,
T. F. WALLACE.